United States Patent [19]

Zirps

[11] Patent Number: 4,834,467
[45] Date of Patent: May 30, 1989

[54] HYDRAULIC BRAKE BOOSTER WITH ANTI-SKID MASTER CYLINDER PLUNGER STOP BUSHING

[75] Inventor: Wilhelm Zirps, Hemmingen, Fed. Rep. of Germany

[73] Assignee: Robert Bosch GmbH, Stuttgart, Fed. Rep. of Germany

[21] Appl. No.: 106,286

[22] Filed: Oct. 9, 1987

[30] Foreign Application Priority Data

Nov. 14, 1986 [DE] Fed. Rep. of Germany ....... 3639003

[51] Int. Cl.$^4$ ............................................... B60T 8/44
[52] U.S. Cl. .................................. 303/114; 60/547.1; 60/563
[58] Field of Search ................. 60/550, 560, 563, 565, 60/566, 577, 591, 547.1; 303/100, 114–119

[56] References Cited

U.S. PATENT DOCUMENTS

| | | |
|---|---|---|
| 4,523,791 | 6/1985 | Belart et al. ................ 303/100 X |
| 4,555,144 | 11/1985 | Belart et al. ................ 303/114 X |
| 4,659,152 | 4/1987 | Reinartz et al. ............... 60/591 X |
| 4,703,978 | 11/1987 | Belart et al. ................ 303/114 X |
| 4,708,405 | 11/1987 | Belart et al. ................ 303/114 X |
| 4,729,609 | 3/1988 | Seibert et al. ................ 303/114 |
| 4,729,610 | 3/1988 | Seibert et al. ................ 303/114 |

FOREIGN PATENT DOCUMENTS 3040562 5/1982 Fed. Rep. of Germany .
2180025 3/1987 United Kingdom ............... 303/114

OTHER PUBLICATIONS

Bleckmann, Burgdorf, von Grünberg, Timtner and Weise, "The First Compact 4-wheel Anti-skid System with Integral Hydraulic Booster", 7/1983, SAE-paper 830483.

*Primary Examiner*—Edward K. Look
*Assistant Examiner*—George Kapsalas
*Attorney, Agent, or Firm*—Edwin E. Greigg

[57] ABSTRACT

A hydraulic vehicle brake system having a brake booster disposed in a housing. The brake booster communicates via an energy supply system with a supply container and via shutoff devices with brake chambers that can be acted upon by plungers via the brake booster. The brake chambers are connected in turn via brake lines and incorporated shutoff valves to wheel brake cylinders of wheel brakes. A stop bushing surrounds the master cylinder piston and has a sleeve, and a spring is disposed between the sleeve and an annular stop integral with the housing. The stop bushing, an inner plunger face and the housing enclose a plunger chamber. In regulated operation, the plunger chamber likewise communicates with the energy supply system via the brake booster and corresponding lines. During normal brake operation the plunger chamber is connected to the supply container via a line connected to a reversible valve.

10 Claims, 1 Drawing Sheet

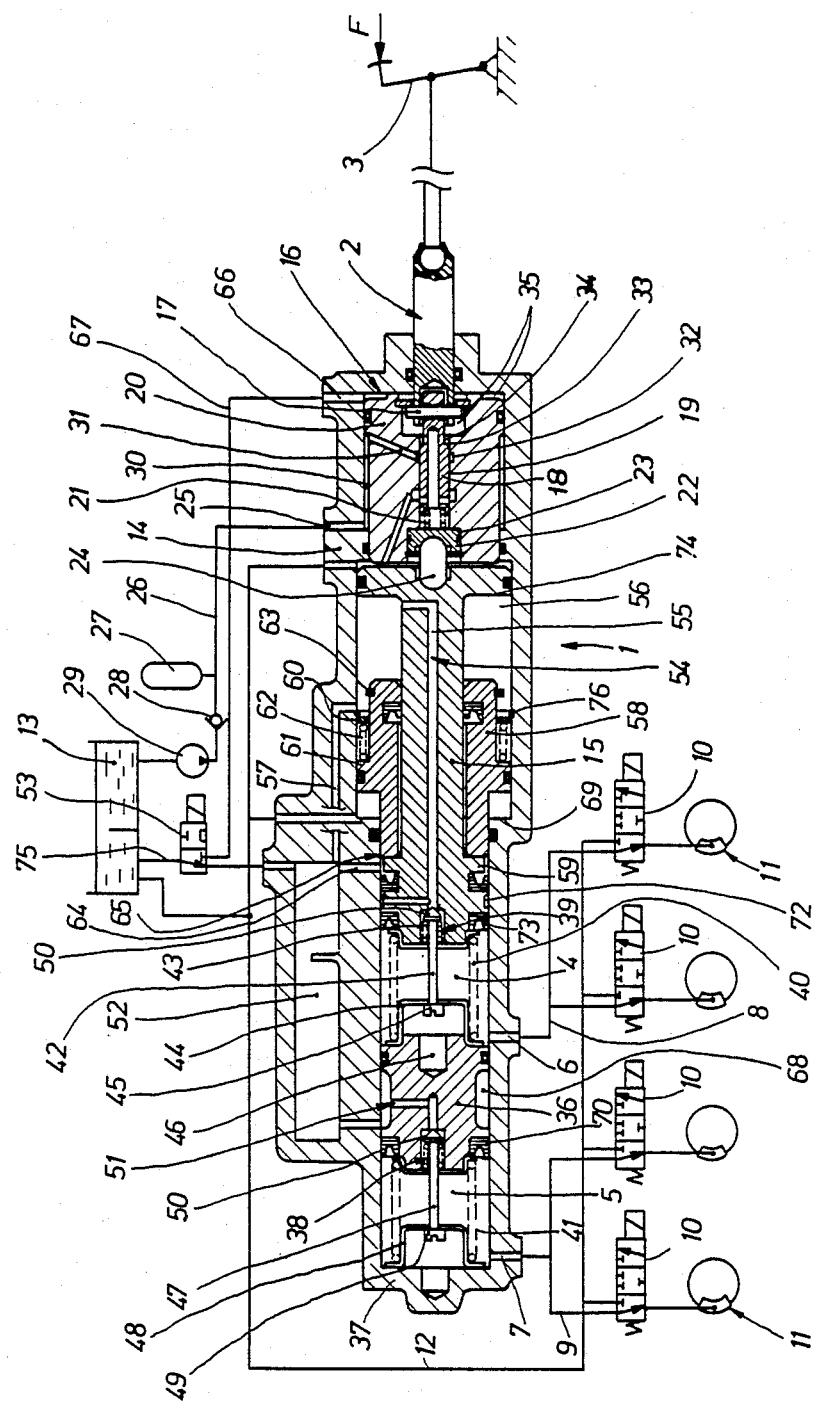

HYDRAULIC BRAKE BOOSTER WITH ANTI-SKID MASTER CYLINDER PLUNGER STOP BUSHING

BACKGROUND OF THE INVENTION

The invention is based on a hydraulic vehicle brake system. Such hydraulic vehicle brake systems having two separate brake circuits, a brake booster, an anti-skid system and hydraulic energy supply systems to supply them, are known, for example from German Offenlegungsschrift No. 30 40 562. There, a brake booster is provided in a housing and is followed by a tandem cylinder arrangement. Located in this tandem cylinder arrangement is a restoring ring plunger, which when the anti-skid system is actuated displaces the cylinder plunger back against the brake pedal, via elements of the brake booster. The piston chamber formed by the restoring ring plunger, the cylinder plunger and the housing communicates exclusively with the supply container, so that the feedback on the brake pedal via the restoring ring plunger is not controlled in any way. Depending on the circumstances when regulated operation—that is, the anti-skid regulation—is initiated, this feedback may be very strong and may be unpleasant for the driver. Moreover, no provision is made in this apparatus for refilling brake fluid into the brake chambers.

Throttle devices especially for damping the pedal return motion are known, but they are subjected to brake fluid flowing through them both in normal braking and during regulated operation. These throttles have the disadvantage that they become plugged-up, from a steady deposition of foreign particles. This defect goes unrecognized by the driver, yet the safety of the brake depends on the reliability of the throttle device. Once the throttle is plugged, the plungers cannot be moved into the intended safety position during braking with the anti-skid system. If the energy supply then fails, the vehicle can be braked only with reduced residual braking action, if at all.

SUMMARY OF THE INVENTION

The hydraulic vehicle brake system according to the invention has the advantage over the prior art that because the plunger chamber embodied by the stop sleeve, the master cylinder plunger and the housing is connected to the brake booster servo system, control of the return motion of the stop sleeve and hence of the master cylinder plunger takes place, so that the return motion does not have an unpleasant effect on the driver using the brake pedal.

During normal operation of the brake system, the valve, provided in accordance with the invention, that is capable of connecting the plunger chamber and the servo line remains switched over to communication between the plunger chamber and the supply container. In this manner, during normal operation, brake fluid flows without hindrance from the plunger chamber into the supply container. Similarly, when the master cylinder plunger is returned during normal operation, the valve is not switched over to the servo line, so that the plunger chamber can be filled, unhindered, by the inflow of hydraulic fluid from the supply container.

According to the invention, an annular conduit or annular channel is also provided on the master cylinder plunger, as well as on the following plunger in the event a tandem cylinder arrangement is provided. While for the sake of simplicity, the annular chamber of the following plunger can be made to communicate directly via the aforementioned valve, with either the servo line or the line to the supply container. An axial bore leads from the annular conduit of the master cylinder plunger to the piston chamber and in this way communicates via the valve with either the servo line or the line to the supply container.

Besides the annular conduit or annular chamber, a seal, preferably a lip seal, is also provided surrounding the associated plunger, but nevertheless assuring a flow of hydraulic fluid from the annular conduit or annular chamber to the respective brake chamber. This flow is permitted in only one direction, however, namely from the annular chamber or annular conduit to the respective brake chamber; in the opposite direction, the seal effects sealing.

The annular chamber and the annular conduit have significance primarily during regulated operation. If one of the braked wheels approaches the threshold of skidding, then the associated wheel brake is isolated from the master brake cylinder by associated magnetic valves. The pressure in this isolated wheel brake can then be maintained, or dropped by draining brake fluid into the supply container. At the same time, however, the aforementioned valve is also switched over from communication with the line to the supply container to communication with the servo line. Then a servo pressure, which is approximately equivalent to the pressure in the brake chambers, prevails in all the interconnecting spaces, and in particular in the plunger chamber, the annular conduit and the annular chamber. However, the servo pressure can be increased still further by exerting increased pressure on the pedal, with the result that brake fluid flows out of the annular chamber and the annular conduit directly into the brake chambers via the seal, until the pressures are in equilibrium. In this way, brake fluid is refilled even when the pressure in the brake chambers drops because of regulated operation.

The invention also provides that the axial bore in the master cylinder plunger, or a line system branching off from the annular chamber in a tandem plunger may optionally be closed off from the associated brake chamber by a reaspiration valve. This reaspiration valve serves especially to close off the brake chambers when there is brake pressure, so that no fluid can drain out of the brake chambers via the respective lines or chambers into the supply container, especially during normal operation.

The reaspiration valve substantially comprises a conical attachment mounted on a guide rod and having its fitting valve seat in the axial bore or in the line system. The conical attachment is braced via a spring in a face bore of the associated plunger in such a way that the associated axial bore or line system is open when the brake is not actuated. Only when the brake is actuated does it take its valve seat. However, if a servo pressure that is elevated with respect to the pressure in the brake pressures prevails in the axial bore or line system, then brake fluid can drain into the brake chambers via the reaspiration valve. It also open especially when the plunger returns to its initial position and then automatically aspirates brake fluid from the line system or axial bore and from the chambers or lines that follow.

To assure opening of the reaspiration valve in the initial position, a head is formed onto the guide rod which in a defined end position strikes a cap or equivalent extension and prevents further followup by the reaspiration valve of the plunger movement.

Preferably, the master cylinder plunger should have a collar, as a stop for the stop bushing. Under the pressure of the bushing spring, which is supported on one end on a stop integral with the housing and on the other on a rib around the stop bushing, the stop bushing follows up the movement of the master cylinder plunger until the stop bushing rests with its rib on a housing shoulder provided in accordance with the invention. At this instant, with a control edge, it partly closes a bore that in turn provides communication of the brake system with the supply container, during normal operation, and with the servo line, during regulated operation.

During normal braking operation of the present vehicle brake system, the brake booster is actuated by actuation of the foot brake via a rod. The master cylinder plunger and an optional tandem plunger that follows are carried along by a corresponding servo plunger of the brake booster, and the reaspiration valves are closed. At the same time, fluid flows out of the brake chambers via the brake lines to the wheel brakes. The pressure in the wheel brakes is equivalent to the pressure in the brake booster chamber, so that a fixed relationship exists between the braking action and the pedal force exerted. When the action of the brake pedal stops, the master cylinder plunger and the optional tandem plunger that follows are returned to their initial position, whereupon the reaspiration valves open and aspirate brake fluid into the brake chambers.

When the master cylinder plunger is displaced, then initially the stop bushing, under the pressure of its spring, also moves with the master cylinder plunger, resting on its collar. After a short distance, however, a snap ring fitted around the stop bushing prevents further relaxation of the spring, so that the stop bushing comes to a standstill even if the master cylinder plunger continues to move. In this position, the control edge partly covers the bore, so that the space between the collar and the control edge, which is expanding during the movement of the master cylinder plunger, and the supply container are made to communicate. Brake fluid can also be aspirated through this bore into this space, and also is distributed in the clearance between the stop bushing and the master cylinder plunger.

If one of the braked wheels now approaches the threshold of skidding, then regulated operation begins; that is, the associated wheel brake is isolated from the master brake plunger, and at the same time the valve is switched over to the servo line, from the line reading to the supply container. Now not only the aforementioned annular conduit, annular chamber and plunger chamber, but also the space formed in the meantime between the collar and the plunger chamber, are under servo pressure. This has the effect that when there is increased brake force, as described in detail above, brake fluid can drain from the annular chamber or the annular conduit via the seal into the brake chamber, until the pressures are in equilibrium. However, a still further increasing pressure in the plunger chamber has an effect on the inside face of the master cylinder plunger, causing this plunger to be guided counter to the brake pressure. In this process, though, the master cylinder plunger, with its collar, must expel the fluid that meanwhile had entered through the bore to between the collar and the control edge of the stop bushing back again, through the bore that is partially covered by the stop bushing. The time needed for expelling this fluid determines the restoring speed of the pedal, and it can be varied by how the remaining cross section of the bore is dimensioned. A damped pedal return is thereby obtained, which is not perceived as unpleasant by the driver. As soon as the collar rests on the stop bushing again, the damped pedal return is dispensed with, but then it is no longer necessary, because the pressure in the brake chambers has relaxed sufficiently. The stop bushing, the master cylinder plunger and the optional tandem plunger are then returned to the initial position under the pressure of their respective springs.

This vehicle brake system according to the invention has the advantage that throttling of the return of the associated plunger takes place only during braking in regulated operation, and the flowthrough cross section is fully opened immediately thereafter, thus precluding the deposition there of foreign particles.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing shows the brake system according to the invention, partly in the form of a block circuit diagram and partly in a sectional view.

DESCRIPTION OF THE PREFERRED EMBODIMENT

A master brake cylinder 1, shown in cross section, is connected via a rod 2 with a brake pedal 3, upon which a pedal force can act in the direction F to effect braking.

Two brake pressure chambers 4 and 5, connected in succession in tandem fashion, are provided in the master brake cylinder 1, communicating via respective outlets 6 and 7, with associated brake lines 8 and 9 and magnetic valves 10 with wheel brakes 11. A return line 12 leads from the magnetic valves 10 back to a supply container 13 for the brake fluid.

The elements of the master brake cylinder 1 are disposed in a housing 14, and a master cylinder plunger 15 is connected to the brake pedal 3 via a brakebooster 16 and the rod 2. The rod 2 is connected via a pin 17 to a control slide 18, which is slidably supported in an axial bore 19 or a servo plunger 20. On the far side of the rod 2, the control slide 18 is braced against a spring support 22, via a spring 21, and the spring support, likewise sliding axially, is provided in an enlarged axial bore 23 in the servo plunger 20. A thrust bolt 24 is retained between the spring support 22 and the master cylinder plunger 15.

The brake booster 16 communicates via an inlet 25 in the housing 14 and via a line 26 with a reservoir 27, on the one hand, and via a one-way check valve 28 and a pump 29 with the supply container 13. Via the line 26, pressure fluid flows through the inlet 25 into an annular conduit 30 provided between the housing 14 and the servo plunger 20. This annular conduit 30 communicates via a radial bore 31 with an annular chamber 32 disposed between the servo plunger 20 and the control slide 18. In the exemplary embodiment shown in the drawing, this annular chamber 32 is blocked off by the position of the control slide 18. At the same time, the control slide 18 is fixed in its position of repose by the spring 21. Since the servo plunger 20 is embodied as a stepped plunger, the pressure in the annular chamber 32 has the effect that in its position of repose, the servo plunger also rests on the right on the housing 14.

If the control slide 18 is displaced to the left by the pedal force F via the rod 2, counter to the pressure of the spring 21, then initially the servo plunger 20 remains in its position of repose, because of the action of the pressure prevailing in the line 26 or in the annular conduit 30 and because of its friction. The control slide 18 is therefore displaced to the left relative to the servo plunger 20, so that a control edge 33 of the control slide 18 overtakes the rim of the annular chamber 32. Now, pressure fluid can flow out of the reservoir 27, which is put under pressure, into a chamber 35 via a recess 34 following the control edge 33 on the control slide 18 and can displace the servo plunger 20 to the left as well. This continues as long as the control slide 18 is ahead of the servo plunger 20 and the control edge 33 keeps the communication open between the annular chamber 32 and the chamber 35.

On the far side of the thrust bolt 24, the master cylinder plunger 15, together with a further plunger 36, defines the brake chamber 4, and together with a housing bottom 37 defines the brake chamber 5. The master cylinder plunger 15 is supported in the brake chamber 4 with respect to the plunger 36 via a spring 40, and the plunger 36 is supported with respect to the housing bottom 37 via a spring 41. The master cylinder plunger 15 is also connected to the plunger 36 via a guide rod 42, which with one end engages a face bore 43 in the master cylinder plunger 15 and on the other rests from inside, with a head 45, on a cap 44 mounted on the plunger 36. Under the pressure of the spring 40, the master cylinder plunger 15 and the plunger 36 are axially displaceable toward one another to a limited extent, in the course of which the head 45 can plunge into a blind bore 46 in the plunger 36.

A similar arrangement is also provided for a guide rod 47 between the plunger 36 and the housing bottom 37. On one end, this guide rod 47 also engages a face bore (not identified by reference numeral) in the plunger 36, and on the other it is retained by a head 49 which from the inside strikes an extension 48 that rests firmly on the housing bottom 37.

In the face bore 43 of the master cylinder plunger 15 and in the face bore of the plunger 36, the respective guide rods 42 and 47 form a respective reaspiration valve 38 and 39. To this end, both guide rods 42 and 47 have a spring-supported conical attachment 50. The conical attachment 50 of the plunger 36 is capable of closing a line system 51, which leads to a collecting chamber 52 and from there via a magnetic valve 53 to the supply container 13.

The conical attachment 50 of the reaspiration valve 39 can also close a line system 39, which leads to the collecting chamber 52 via an axial bore 55 in the master cylinder plunger 15, a plunger chamber 56 and a supply line 57. Via this collecting chamber 52, both the line system 54 and the intermediate circuit of the magnetic valve 53 then likewise communicate with the supply container 13.

In the plunger chamber 56, the master cylinder plunger 15 is surrounded by a stop bushing 58, which rests with its face end remote from the pedal on a collar 59 of the master cylinder plunger 15. To limit the stop bushing 58, a washer 60 is provided, and a spring 62 is supported in between this washer and a sleeve 61 formed onto the stop bushing 58. An annular stop 76 supported by a groove in the housing supports washer 60.

The mode of operation of the brake system will now be described:

As mentioned above, the displacement of the control slide 18 opens a passage from the annular chamber 32 to the chamber 35, and the servo plunger 20 is displaced toward the left, under the pressure of the fluid from the pressure reservoir 27, via the line 26, inlet 25, annular chamber 30 and radial bore 31. In so doing, the servo piston 20 moves the thrust bolt 24 along as well, which in turn acts upon the master cylinder plunger 15. In this process the reaspiration valve 39 is closed, because the conical attachment 50 assumes its valve seat in the axial bore 55. Under the pressure of the master cylinder plunger 15, brake fluid flows out of the brake chamber 4 through the outlet 6 and the brake line 8 to reach the corresponding wheel brakes 11. At the same time, the plunger 36 is also displaced to the left and its reaspiration valve 38 is closed. Under the pressure of the plunger 36, brake fluid now flows out of the brake chamber 5 via the outlet 7 and the brake line 9 to reach the wheel brakes 11 connected thereto. Since the pressure in the wheel brakes is equivalent to the pressure in the chamber 35 and the pressure in chamber 35 acts upon the rod 2 contrary to the pedal force F, there is also a fixed relationship between the braking action and the pedal force F.

Upon displacement of the master cylinder plunger 15, the stop bushing 58 initially moves to the left as well, under the force of the spring 62, until a snap ring 63 provided on the stop bushing 58 strikes the washer 60. Now the spring 62 no longer relaxes any further, and the stop bushing 58 comes to a standstill, even if the master cylinder plunger 15 continues to be displaced to the left. In that position, a bore 64 leading to the collecting chamber 52 is partly covered by a control edge 65 of the stop bushing 58.

If one of the braked wheels now approaches the threshold of skidding, which can be detected by a known wheel sensor, now shown, then the associated wheel brake 11 is isolated from the master brake cylinder 1 by means of the associated magnetic valve 10. The pressure in this isolated wheel brake 11 can now be either maintained, or lowered by draining brake fluid into the supply container 13.

At the same time, the magnetic valve 53 is switched over, effecting communication of the chamber 35 with the collecting chamber 52, via a connecting bore 66 and a line 67, as well as with the plunger chamber 56, via this collecting chamber 52 and the supply line 57, and finally with an annular chamber 68, via the line system 51. In the plunger chamber 56 and the annular chamber 68, the pressure regulated via the control slide 18 now prevails; this pressure is approximately equivalent to the pressure in the brake chambers 4 and 5.

The pressure rise in the plunger chamber 56 and in the annular chamber 68 has the following effects:

(a) Upon slight braking, at low brake pressure, during which the sleeve 61 of the stop bushing 58 does not come into contact with a housing shoulder 69, the stop bushing 58 is supported on the collar 59 of the master cylinder plunger 15. No outwardly acting axial forces are generated.

Upon stronger depression of the pedal under the pedal force F, the stop bushing 58 strikes the housing shoulder 69. If the pedal force F is increased still further, this causes a further rise of pressure in the chamber 35 and in the spaces communicating with it. As a result, the pressure in the plunger chamber 56 and in the annular chamber 68 is also increased, via the line 67, the collecting chamber 52, the line system 51 and the supply line 57. As a result, brake fluid passes directly out of the annular chamber 68 via a lip seal 70 into the brake chamber 5, and from the plunger chamber 56 via the axial bore 55, a radial bore 71, an annular conduit 72 and a lip seal 73 into the brake chamber 4, until the pressures have equalized. Brake fluid is also resupplied in the same manner, if the pressure in the brake chambers 4 and 5 drops because of regulated operation.

With decreasing pedal force F, the brake pedal 3 is displaced initially to the right by the rod 2 that is under servo pressure. This movement is followed up by the servo plunger 20, the master cylinder plunger 15 and the plunger 36, but only within a predetermined stroke range, because after that the reaspiration valves open, and the brake chambers 4 and 5 are made to communicate with the chamber 35 via the respective line systems 51 and 54. As the pedal force F decreases, the servo pressure in the chamber 35 and the brake chambers 4 and 5 drops further, without motion on the part of the master cylinder plunger 15 and the plunger 36.

(b) If the braking was more pronounced prior to the onset of regulation, then the introduction of the servo pressure from the chamber 35 via the collecting chamber 52, the supply line 57 and the plunger chamber 56 displaces the stop bushing 58 to the left as far as the housing shoulder 69. In this process, the bore 64 is closed, except for a small remaining cross section, by the control edge 65 on the stop bushing 58. The pressure now rising further in the plunger chamber 56 acts upon the larger inside surface 74, nearer the pedal, of the master cylinder plunger 15, causing the servo plunger 20 and, via the rod 2, the brake pedal 3 as well to be displaced toward the right into the safety position, counter to the pedal force F. The fluid enclosed between the collar 59 and the control edge 65 of the stop bushing 58 must then be expelled into the collecting chamber 52 via the small remaining cross section of the bore 64. This time needed for expelling the fluid determines the restoring speed of the brake pedal 3 and can be varied by the manner in which the remaining cross section of the bore 64 is dimensioned.

Once the master cylinder plunger 15 rests with its collar 59 on the stop bushing 58, the remaining course of operation is as described above in section (a).

The foregoing relates to a preferred exemplary embodiment of the invention, it being understood that other variants and embodiments thereof are possible within the spirit and scope of the invention, the latter being defined by the appended claims.

I claim:

1. A hydraulic vehicle brake system comprising a housing, a brake booster (16) disposed in said housing, an energy supply system, said brake booster communicating via said energy supply system with a supply container (13) and via shutoff devices with brake chambers (4) and (5) in said housing, a master cylinder plunger (15) and a further plunger (36) in said brake chambers which are acted upon via said brake booster, said master cylinder plunger includes a stop collar (59) which stops a stop bushing (58), a housing shoulder forms a further stop for said stop bushing (58) via a sleeve (61), brake lines (8, 9), which incorporate shutoff valves (10) therein, connect said brake chambers to wheel brake cylinders of wheel brakes (11), said stop bushing (58) surrounding said master cylinder plunger, said stop bushing including said sleeve (61), a spring (62) disposed between said sleeve and an annular stop (76) supported by said housing, said stop bushing, an inner face (74) of an enlarged end of said master cylinder plunger and said housing enclose a plunger chamber (56), said plunger chamber (56) communicates with said energy supply system (29, 27, 26) via said brake booster (16), a bore (57), and servo line (67), said plunger chamber being adapted to be connected to said supply container (13) via a line (75) connected to a reversible valve (53).

2. A vehicle brake system as defined by claim 1, in which said further plunger (36) includes an annular chamber (68) which communicates directly with a fluid chamber (52), and an annular conduit (72) of the master cylinder plunger (15) communicates via an axial bore (55), said plunger chamber (56) and said bore (57) with said fluid chamber (52), said fluid chamber (52) is connected to said reversible valve (53), and the line (75) connects said reversible valve (53) to the supply container (13), and said fluid chamber may communicate with said servo line (67) connected to said reversible valve (53) by reversing reversible valve (53).

3. A vehicle brake system as defined by claim 2, in which said axial bore (55) and a line system (51) branching off from the annular chamber (68) can be closed off toward the respective brake chamber (4 or 5) by respective first and second reaspiration valves (39) and (38).

4. A vehicle brake system as defined in claim 3, in which said second reaspiration valve (38) includes a second conical attachment (50) on a second guide rod (47), and said first reaspiration valve (39) includes a first conical attachment (50) on a first guide rod (42), said first conical attachment of said first reaspiration valve (39) engages said axial bore (55) and said second conical attachment of said second reaspiration valve (38) engages said line system (51), said second conical attachment (50) is braced by a spring support in a second face bore of said further plunger (36) and said first conical attachment is braced by a spring support in a first face bore in said master cylinder plunger (15), and a first head (45) formed on said first guide rod (42) and a second head (49) formed on said second guide rod (47), together with a cap (44) and extension (48), form stops for opening said first and second reaspiration valves (39) and (38), respectively.

5. A vehicle brake system as defined by claim 2, in which said annular chamber (68) and said annular conduit (72) communicate with said brake chambers (4, 5), and seals (70, 73) allow hydraulic fluid to pass through on one side of said annular chamber (68) and annular conduit (72).

6. A vehicle brake system as defined by claim 5, in which said axial bore (55) and a line system (51) branching off from the annular chamber (68) can be closed off toward the respective brake chamber (4 or 5) by respective first and second reaspiration valves (39) and (38).

7. A vehicle brake system as defined in claim 6, in which said second reaspiration valve (38) includes a second conical attachment (50) on a second guide rod (47), and said first reaspiration valve (39) includes a first conical attachment (50) on a first guide rod (42), said first conical attachment of said first reaspiration valve (39) engages said axial bore (55) and said second conical attachment of said second reaspiration valve (38) engages said line system (51), said second conical attachment (50) is braced by a spring support in a second face bore of said further plunger (36) and said first conical attachment is braced by a spring support in a first face bore in said master cylinder plunger (15), and a first head (45) formed on said first guide rod (42) and a second head (49) formed on said second guide rod (47), together with a cap (44) and extension (48), form stops for opening said first and second reaspiration valves (39) and (38), respectively.

8. A vehicle brake system as defined by claim 2, wherein a spring (62) is supported between said sleeve (61) and a washer (60) which is supported by said annular stop (76) upon movement of the stop bushing (58).

9. A vehicle brake system as defined by claim 8, in which said stop bushing includes a control edge (65), upon contact of the sleeve (61) with the housing shoulder (69), said control edge on said stop bushing (58), partly closes a bore (64), which during normal operation effects communication with the supply container (13) and during regulated operation effects communication with the servo line (67).

10. A vehicle brake system as defined by claim 9, in which the annular chamber (68) and the bore (64) communicate with a collecting chamber (52), and said plunger chamber (56) connects via said bore (57) with collecting chamber (52) which is disposed downstream of said reversible valve (53), and said collecting chamber connects with said reversible valve.

* * * * *